United States Patent [19]

Langguth

[11] 3,976,274

[45] Aug. 24, 1976

[54] PERMANENT ATTACHMENT FOR SUCTION CUPS

[75] Inventor: Arthur F. Langguth, San Diego, Calif.

[73] Assignee: The United States of America as represented by the Secretary of the Navy, Washington, D.C.

[22] Filed: May 27, 1975

[21] Appl. No.: 581,319

[52] U.S. Cl. .............................. 248/363; 156/71; 156/285; 248/206 R
[51] Int. Cl.² .......................................... A45D 42/14
[58] Field of Search......... 248/363, 362, 467, 206 R; 156/71, 285, 330, 338, 333

[56] References Cited
UNITED STATES PATENTS

| | | | |
|---|---|---|---|
| 2,190,550 | 2/1940 | Simmons | 248/206 R |
| 2,319,727 | 5/1943 | Duggan | 248/206 R |
| 2,557,434 | 6/1951 | Hoverder | 248/206 R |
| 2,717,472 | 9/1955 | Wilmington | 248/206 R |
| 2,940,713 | 6/1960 | Van Dusen | 248/206 R |
| 3,861,976 | 1/1975 | Gayner et al. | 156/330 |
| 3,861,978 | 1/1975 | Connole et al. | 156/330 |
| 3,895,982 | 7/1975 | Persson | 156/71 |

FOREIGN PATENTS OR APPLICATIONS

| | | | |
|---|---|---|---|
| 1,680,027 | 8/1971 | Germany | 156/71 |

Primary Examiner—Robert A. Hafer
Attorney, Agent, or Firm—Richard S. Sciascia; Ervin F. Johnston; Thomas Glenn Keough

[57] ABSTRACT

A suction cup is configured to assure a permanent attachment of an instrumentation package to a surface. A dish shaped body member is provided with an annular lip which resiliently engages this surface. A radially outwardly disposed ring shaped recess contains a highly resilient material, such as gum rubber or adhesive liquid. This material is extruded out of the recess as the annular lip is pressed against the surface to ensure a long term, permanent attachment.

5 Claims, 5 Drawing Figures

PERMANENT ATTACHMENT FOR SUCTION CUPS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

A wide variety of suction cups have been with us for some time. In one form or another they generally rely on a flexible lip seated on a surface and a vacuum created to hold the cup in place. These two conditions must simultaneously occur for the suction cups to function properly. Because of this fact, these cups are prone to fail for usually the lips leak and the vacuums diminish. To overcome this problem some designs have provided for a continuously running vacuum pump to compensate for the leakage. However, the vacuum pump unduly complicates most vacuum attachments. In none of the known sealing arrangements is there the provision of an auxilliary ring of a highly compliant or liquid adhesive which is brought to bear on the surface as an adjacent sealing lip is pressed against it. There is a continuing need in the state of the art for a suction cup which eliminates leakage to assure a permanent attachment to a nonuniform surface.

SUMMARY OF THE INVENTION

The present invention is directed to providing an apparatus for attaching an object to a surface. A body member is coupled to the object and has a cavity for resiliently creating a suction when an annular lip resiliently engages the surface. A ring shaped recess is molded on an annular extention of the body member and it contains a sealing means. The sealing means is extruded from the recess onto the surface as the lip is pressed against the surface to ensure that there is no leakage.

Therefore, the prime object of the invention is to provide an improved suction cup.

Still another object is to provide a suction cup configured to assure a nearly permanent attachment on a surface.

Still another object is to provide a suction cup capable of being attached to a nonuniform surface or a surface having small irregularities.

Another object is to provide an improved suction cup which extrudes a secondary sealing element from a ring shaped recess to assure a more permanent mounting on a surface.

Yet another object is to provide a suction cup which is permanent in nature by its inclusion of a quantity of liquid adhesive.

Still another object is to provide an improved suction cup ideally suited for underwater use.

These and other objects of the invention will become more readily apparent from the ensuing specification when taken together with the drawings.

DESCRIPTION OF THE PREFERRED EMBODIMENTS

Figure 1:
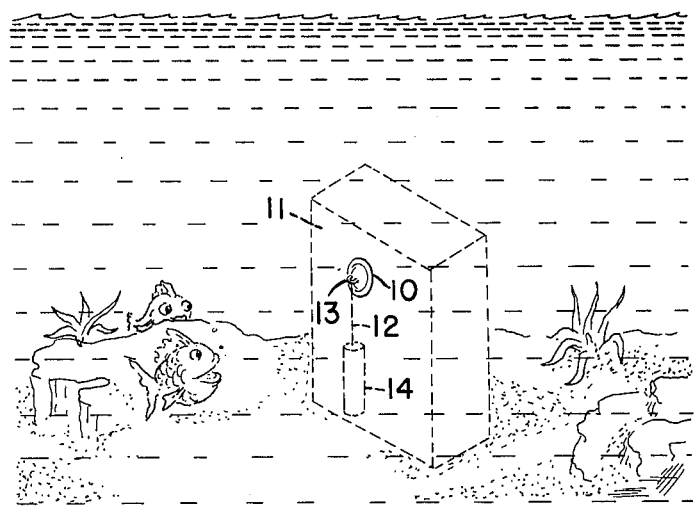
FIG. 1 is an isometric depiction of the invention deployed underwater.

Referring now to FIG. 1, a representative embodiment of an improved suction cup 10 is gripping a surface 11 of an undersea structural member. Because it is underwater, there is a strong likelihood that marine fouling has already created surface irregularities. Irrespective of the nonuniform surface, a nearly permanent attachment is assured by this invention.

A line 12 is looped through an eye 13 of the cup and an instrumentation package 14 is suspended in the water. The instrumentation package is any one of a variety of undersea sensors for monitoring some ambient phenomena be it salinity, temperature, etc.

The improved suction cup includes a dish shaped central portion 15 flaring out into an annular rim portion 16. A cavity 15a is contained in the central portion and the rim portion has a smooth underside for resiliently engaging a surface when the cavity is compressed. Outwardly from the rim an extension 17 includes a first inner portion 19 and a second outer portion 20 which cooperate to define the limits of a ring shaped recess 18.

The central portion, annular rim extention, and eye 13 are integrally molded from an elastomer material. A suitable elastomer is neoprene rubber having a 30 to 40 durometer hardness. Such a rubber dimensioned as schematically depicted creates a sufficient vacuum when cavity 15a is compressed.

Figure 2:
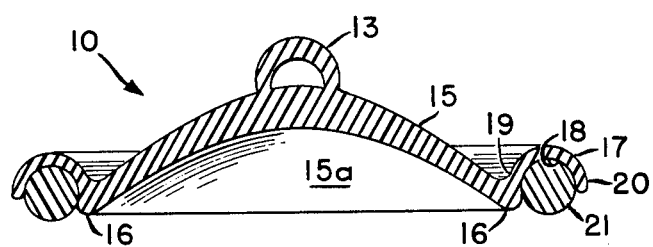
FIG. 2 is a cross-sectional view of one embodiment of the invention prior to being attached.
Figure 3:
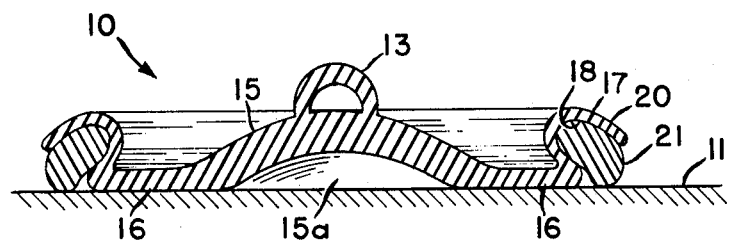
FIG. 3 is a cross-sectional view of the invention mounted on a surface.

The novel element which ensures the more reliable operation of the embodiment of FIGS. 2 and 3 is a highly resilient sealing material 21 disposed in ring shaped recess 18. The sealing material is an unvulcanized gum rubber, a partially cured synthetic rubber (not enough catalyst), or any equivalent, highly resilient substance. As such, the sealing material compliantly conforms to and accommodates surface irregularities on surface 11. Even if there is slight leakage across annular rim 16, only a small pressure differential would be created across the ring of sealing material 21. Because of its close fit on the surface, further leakage is prevented.

The supplemental seal provided by the sealing material is created when central portion 15 is pressed against the surface. This pressure overcomes the biasing effect of the integrally molded suction cup and a vacuum is created in cavity 15a. When the inside area of annular rim portion 16 is pushed against the surface it contacts the surface increases to resiliently engage the surface. Simultaneously, outer portion 20 remains at its preset dimension while inner portion 19 is forced outwardly by the annular rim portion. The convergent forces working between the inner and outer portions reduce the size of ring shaped recess 18 and it extrudes the sealing material from the hollow. Sealing material 21 is extruded onto surface 11 and surface irregularities are accommodated in a sealing relationship.

Leakages are thereby blocked. As mentioned before, even if small leaks by-pass annular lip 16, the pressure differential across the continuously extending sealing area presented by sealing material 21 would by insufficient to allow further leakage. Thus, permanent attachment is made to a surface by the mutual cooperation of the seal created along the annular rim and the ring of sealing material.

Figure 4:
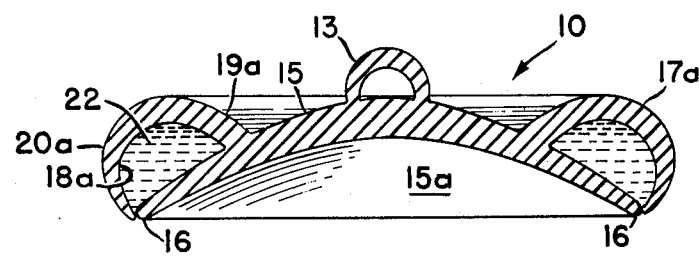
FIG. 4 is a cross-sectional view of another embodiment of the invention.
Figure 5:
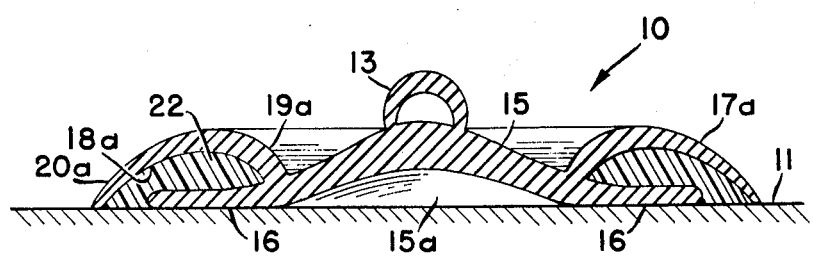
FIG. 5 depicts the other embodiment of the invention engaging the surface.

A slightly differently configured embodiment of the invention is shown in cross section in FIGS. 4 and 5. Like reference characters denote like elements. It should be noted that inner portion 19a and outer portion 20a are somewhat modified and ring shaped recess 18a is disposed on the top of central portion 15. Instead of semirigid material 21, a water hardening epoxy 22 is carried in the recess.

Depressing central portion 15 on a surface 11 reduces the dimensions of cavity 15a and extends the area on which annular rim 16 contacts the surface. Simultaneously because outer portion 20a resists outward travel and inner portion 19a is pushed out by the annular rim, epoxy 22 is extruded from recess 18a. The epoxy adheres to surface 11 and after a short time bonds the suction cup in place to create an interconnection that is truly permanent.

The two disclosed embodiments function equally well in air or underwater. Both are fully capable of making a permanent interconnection onto a surface. The embodiment of FIGS. 2 and 3 can be removed when needed while the embodiment of FIGS. 3 and 4 tends to be completely permanent in nature.

Obviously, many modifications and variations of the present invention are possible in the light of the above teachings, and, it is therefore understood that within the scope of the disclosed inventive concept, the invention may be practiced otherwise than as specifically described.

What is claimed is:

1. An apparatus for attaching an object to a surface comprising:

means coupled to the object and defining a cavity for resiliently creating a suction, the creating means is provided with an annular portion resiliently engaging the surface after the cavity has been compressed, the resiliently creating means includes a molded dish shaped shell of a resilient material and the annular portion increases its area of resilient engagement on the surface as the cavity is being compressed;

means mounted radially outwardly from the annular portion for defining a ring shaped recess configured to be reduced in size upon the compression of the cavity, the ring shaped recess having a first portion and a second portion integrally formed with the resiliently creating means, the second portion is disposed radially outwardly of the first portion, said first portion moves radially outwardly toward said second portion as the cavity is compressed to compress the ring shaped recess; and means disposed in the ring shaped recess and being extruded therefrom as the cavity and the ring shaped recess are being compressed, thereby creating a second sealing surface outside the annular portion for sealing the annular portion on the surface.

2. An apparatus according to claim 1 in which the sealing means is a liquid adhesive.

3. An apparatus according to claim 1 in which the liquid adhesive is a water hardening epoxy.

4. An apparatus according to claim 1 in which the sealing means is an unvulcanized gum rubber.

5. An apparatus according to claim 1 in which the sealing means is a partially cured synthetic rubber, (not enough catalyst).

* * * * *